(12) United States Patent
Wu et al.

(10) Patent No.: US 9,997,992 B1
(45) Date of Patent: Jun. 12, 2018

(54) DC-DC POWER CONVERTER WITH OVERSHOOT PROTECTION

(71) Applicant: NXP USA, INC., Austin, TX (US)

(72) Inventors: Xiaowen Wu, Shanghai (CN); Lei Tian, Shanghai (CN)

(73) Assignee: NXP USA, INC., Austin, TX (US)

( * ) Notice: Subject to any disclaimer, the term of this patent is extended or adjusted under 35 U.S.C. 154(b) by 0 days. days.

(21) Appl. No.: 15/725,283

(22) Filed: Oct. 5, 2017

(30) Foreign Application Priority Data

Sep. 25, 2017 (CN) .......................... 2017 1 0871710

(51) Int. Cl.
*H02M 3/157* (2006.01)
*H02M 1/32* (2007.01)
*H02M 3/158* (2006.01)
*H02M 1/08* (2006.01)
*H02M 1/00* (2006.01)

(52) U.S. Cl.
CPC ............... *H02M 1/32* (2013.01); *H02M 1/08* (2013.01); *H02M 3/157* (2013.01); *H02M 3/158* (2013.01); *H02M 2001/0003* (2013.01)

(58) Field of Classification Search
CPC ................. H02M 3/135; H02M 3/145; H02M 3/155–3/1578; G05F 1/40; G05F 1/44; G05F 1/56; G05F 1/575
USPC ....... 323/265, 271, 273, 275, 280, 282–285, 323/351
See application file for complete search history.

(56) References Cited

U.S. PATENT DOCUMENTS

| | | | |
|---|---|---|---|
| 9,276,477 B2 | 3/2016 | Thomas et al. | |
| 9,722,587 B2* | 8/2017 | Tsutsumi | H03K 5/08 |
| 2008/0231247 A1* | 9/2008 | Uehara | H02M 3/158 |
| | | | 323/284 |
| 2010/0033146 A1* | 2/2010 | Irissou | H02M 3/156 |
| | | | 323/282 |
| 2011/0018515 A1* | 1/2011 | McCloy-Stevens | H02M 3/1588 |
| | | | 323/284 |

(Continued)

OTHER PUBLICATIONS

Chen Mingyang, Zhao Menglian, and Wu Xiaobo, "A Fixed-Frequency Fast Transient Response DC-DC Controller for VRMs," Journal of Semiconductors, vol. 34, No. 12, Dec. 2013.

(Continued)

*Primary Examiner* — Adolf Berhane
(74) *Attorney, Agent, or Firm* — Charles E. Bergere

(57) ABSTRACT

A DC-DC power converter converts a DC input voltage at an input node into a DC output voltage at an output node. The converter has a main control loop that generates control signals used to control series-connected p-type and n-type switches that selectively connect an inductor to the input node or to ground while operating the converter in either a continuous-conduction mode (CCM) or a discontinuous-conduction mode (DCM). Zero-crossing detection (ZCD) circuitry detects when the inductor current reaches zero and generates a ZCD control signal used to control the n-type switch to inhibit negative inductor currents during the DCM mode. Overshoot-protection (OP) circuitry detects when the DC output voltage gets too high and generates an OP control signal used to control the n-type switch to inhibit overshoot conditions at the output node that can result from CCM-to-DCM mode transitions and from sudden reductions in output current loading.

10 Claims, 5 Drawing Sheets

(56) References Cited

U.S. PATENT DOCUMENTS

2013/0141058 A1* 6/2013 Kris ................ H02M 3/157
                                          323/271
2018/0048232 A1* 2/2018 Adell ............... H02M 3/157

OTHER PUBLICATIONS

Yudai Furukawa et al., "Improvement in Transient Response of Fast P Control DC-DC Converter with Static Model," 4th International Conference on Renewable Energy Research and Applications (ICRERA), Palermo, Italy Nov. 22-25, 2015.

Kelvin K-Sing Leung and Henry Shu-Hung Chung, "Dynamic Hysteresis Band Control of the Buck Converter with Fast Transient Response," IEEE Transactions on Circuits and Systems-II: Experss Briefs, vol. 52, No. 7, Jul. 2005.

* cited by examiner

100

300

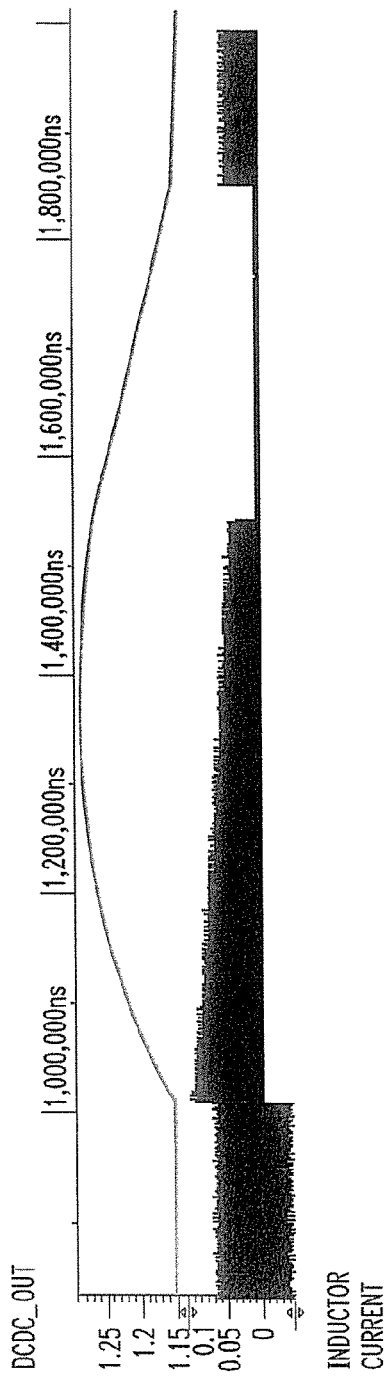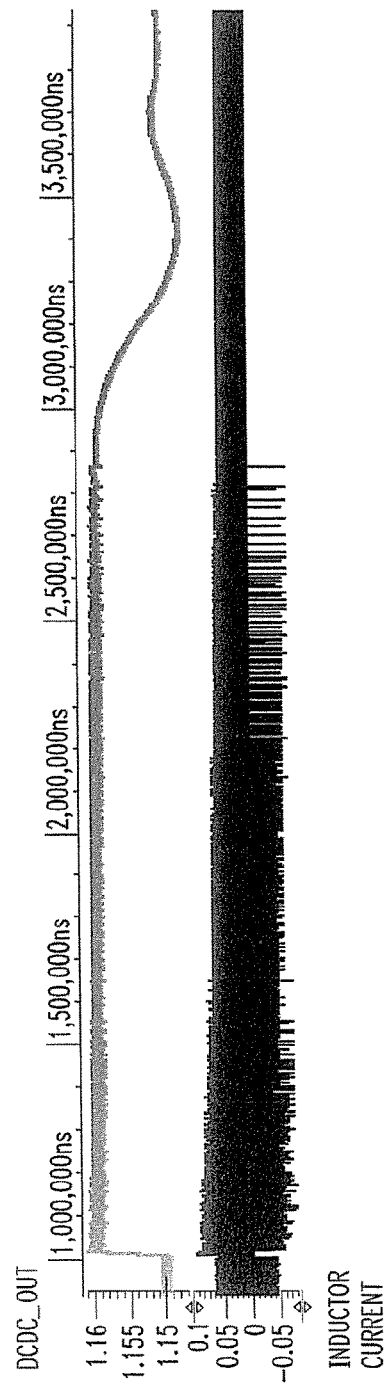

DC-DC POWER CONVERTER WITH OVERSHOOT PROTECTION

BACKGROUND

The present invention relates generally to DC-DC power converters and, more particularly, to DC-DC power converters that automatically switch between continuous-conduction mode (CCM) and discontinuous-conduction mode (DCM).

FIG. 1 is a schematic block diagram of a conventional DC-DC buck power converter 100 that converts a DC input voltage DCDC_IN into a lower DC output voltage DCDC_OUT. In general, the DC-DC converter 100 has control circuitry (110, 120, and 130, described below) that generates control signals PCTRL and NCTRL that are respectively applied to the gates of a p-type MOS transistor switch P_SW and an n-type MOS transistor switch N_SW. When the control signals PCTRL and NCTRL are both low, the switch P_SW is on and the switch N_SW is off, such that the internal node LP is connected to DCDC_IN. When the control signals PCTRL and NCTRL are both high, the switch P_SW is off and the switch N_SW is on, such that the internal node LP is connected to ground. When the control signal PCTRL is high and the control signal NCTRL is low, both switches P_SW and N_SW are off, such that the internal node LP is isolated from both DCDC_IN and ground. The control circuitry is designed such that the control signal PCTRL is never low when the control signal NCTRL is high, so the switches P_SW and N_SW are never both on at the same time.

The DC-DC converter 100 can be operated in either a continuous-conduction mode (CCM) or a discontinuous-conduction mode (DCM). In the CCM mode, the control circuitry controls the switches P_SW and N_SW such that current continuously flows through the inductor L. In certain circumstances, during the CCM mode, the inductor current continuously cycles between positive currents (i.e., current flowing from the internal node LP to the output node DCDC_OUT) and negative currents (i.e., current flowing from the output node DCDC_OUT to the internal node LP). In the DCM mode, the control circuitry controls the switches P_SW and N_SW such that (ideally) the current flowing through the inductor L is never negative. In certain circumstances, during the DCM mode, the inductor current is discontinuous. During cycles in which the inductor current always remains positive, there is no substantive difference between the CCM mode and the DCM mode.

FIG. 2 is a signal diagram illustrating the current flowing through the inductor L during one possible scenario involving an ideal CCM mode (left side of FIG. 2) followed by an ideal DCM mode (right side of FIG. 2) for the DC-DC converter 100. During the CCM mode, the current flowing through the inductor L continuously and linearly cycles between a maximum positive current level and a maximum negative current level. During the DCM mode, the inductor current intermittently cycles linearly between zero current and a maximum positive current level.

In general, during both the CCM mode and the DCM mode, the inductor current is increased by turning on the switch P_SW and turning off the switch N_SW to connect the internal node LP to the input node DCDC_IN, and the inductor current is decreased by turning off the switch P_SW and turning on the switch N_SW to connect the internal node LP to ground. By turning off both switches P_SW and N_SW when the inductor current reaches zero, the inductor current can be kept at zero during the time periods between the intermittent positive-current cycles of the DCM mode.

During the CCM mode, when the inductor current is to be decreased, the switch P_SW is kept off and the switch N_SW is kept on long enough for the inductor current to decrease to the maximum negative current level. During the DCM mode, however, when the inductor current is to be decreased, the switch P_SW is kept off and the switch N_SW is kept on only long enough for the inductor current to decrease to zero. When the inductor current reaches zero, the control circuitry turns off the switch N_SW, while keeping the switch P_SW off. In that case, the inductor current will remain at zero until the control circuitry determines that the inductor current needs to be increased again for the next DCM positive-current cycle, at which time, the control circuitry will turn on the switch P_SW, while keeping the switch N_SW off.

Referring again to FIG. 1, the control circuitry for the DC-DC converter 100 includes all of the elements shown in FIG. 1 except for the switches P_SW and N_SW and the inductor L. The function of the control circuitry is to generate the switch control signals PCTRL and NCTRL that control the turning on and turning off of the switches P_SW and N_SW, respectively. The control circuitry includes a main control loop 110, zero-crossing detection (ZCD) circuitry 120, and an AND gate 130.

The main control loop 110 includes a feedback controller 111, a pulse-width modulator (PWM) 112, and a pre-driver 113. During both the CCM mode and the DCM mode and based on the voltage feedback signal dcdc_out_sns_1, the main control loop 110 generates the switch control signal PCTRL that is applied to the gate of the switch P_SW and the main-loop control signal 114 that is applied to one of the inputs to the AND gate 130.

The ZCD circuitry 120 includes a ZCD comparator 121, a ZCD flip-flop 123, an inverting ZCD set-reset (SR) latch 124, and inverters 125 and 127. During the DCM mode and based on the voltage at the internal node LP, the ZCD circuitry 120 generates the latch output signal zcd_b_latch that is applied to the other input to the AND gate 130. The purpose of the ZCD circuitry 120 is to detect when the inductor current reaches zero during the DCM mode in order to determine when to turn off the switch N_SW.

The AND gate 130 receives both the main-loop control signal 114 and the latch output signal zcd_b_latch and generates the control signal NCTRL.

During the CCM mode, the ZCD comparator 121 is disabled such that the latch output signal zcd_b_latch is always high. (Note that the control signal for disabling/enabling the ZCD comparator 121 is not shown in FIG. 1.) When the latch output signal zcd_b_latch is high, the AND gate 130 ensures that the switch control signal NCTRL is equal to the main-loop control signal 114. Thus, when the ZCD comparator 121 is disabled during the CCM mode, the main control loop 110 generates the switch control signals PCTRL and NCTRL to cause the inductor current to go both positive and negative.

During the CCM mode, the ZCD comparator 121 is enabled to configure the DC-DC converter 100 into the DCM mode. The ZCD comparator 121 compares the voltage at the internal node LP to the ground voltage GND. The resulting ZCD comparator output 122 is applied to the clock input CK of the ZCD flip-flop 123, which also receives (i) the input signal TIE_HIGH at its data input D and (ii) the reset signal reset_zcd at its reset input R.

Although not shown in FIG. 1, the DC-DC converter 100 has circuitry that generates the signal TIE_HIGH to be equal to the input voltage DCDC_IN. The flip-flop reset signal reset_zcd is generated by the inverter 125 to be the complement of the switch control signal NCTRL. The latch input signal zcd_latch, which is generated at the data output Q of the ZCD flip-flop 123, is applied as input to the inverting ZCD SR latch 124, which in turn generates the latch output signal zcd_b_latch as the complement to the latch input signal zcd_latch. Note that the ZCD SR latch 124 also receives a latch reset signal 128, which is generated by the inverter 127 to be the complement of the switch control signal PCTRL.

During the DCM mode, when the inductor current is to be increased (i.e., from 0 to the maximum positive current), the control circuitry causes the control signals PCTRL and a main-loop control signal 114 output from the pre-driver 113 to be both low, such that the switch control signals PCTRL and NCTRL are both low to turn on the switch P_SW and turn off the switch N_SW. In that case, the voltage at the internal node LP will be less than the ground voltage GND, the comparator output signal 122 will remain low, and the ZCD flip-flop 123 will not be triggered. With the switch control signal NCTRL low, the flip-flop reset signal reset_zcd will be high, which will reset the ZCD flip-flop 123, causing the latch input signal zcd_latch to be low. With the switch control signal PCTRL also low, the latch reset signal 128 will be high. In that case, the latch output signal zcd_b_latch will be high, and the switch control signal NCTRL will be determined by the low main-loop control signal 114 from the pre-driver 113.

During the DCM mode, after the inductor reaches the maximum positive current, the inductor current is to be decreased to 0. As such, the control circuitry causes the control signals PCTRL and the main-loop control signal 114 to be both high, such that the switch control signals PCTRL and NCTRL are both high to turn off the switch $P_{13}$ SW and turn on the switch N_SW. Note that the latch output signal zcd_b_latch is still initially high. In that case, as the positive inductor current decreases, the voltage at the internal node LP increases.

When the voltage at the internal node LP crosses zero and become positive, the ZCD comparator output signal 122 will be driven from low to high, thereby triggering the ZCD flip-flop 123. With the switch control signal NCTRL high, the flip-flop reset signal reset_zcd will be low, thereby allowing the latch input signal zcd_latch to be driven high based on the high flip-flop input signal TIE_HIGH. With the switch control signal PCTRL also high, the latch reset signal 128 will be low. In that case, the latch output signal zcd_b_latch will be low, and the switch control signal NCTRL will be driven low, thereby turning off the switch N_SW (even though the main-loop control signal 114 is still high).

Note that the main control loop 110 will continue to periodically generate high values for the main-loop control signal 114, but, since the latch output signal zcd_b_latch will remain low, the switch control signal NCTRL will also remain low, thereby keeping the switch N_SW off. In this way, the inductor current is prevented or at least inhibited from being driven negative during the DCM mode. As a result, the inductor current will remain at zero until the control circuitry determines that it is again time to start another DCM cycle of positive inductor current by driving both the switch control signal PCTRL and the main-loop control signal 114 low to turn on the switch P_SW, while keeping the switch N_SW off.

In order to achieve stable operations efficiently, at start-up, the DC-DC converter 100 is initially configured in the CCM mode with the ZCD comparator 121 disabled. If and when the control circuitry determines that operations should be in the DCM mode, the control circuitry will enable the ZCD comparator 121 to transition from the CCM mode to the DCM mode. Unfortunately, during such transitions, because the main control loop 110 cannot quickly adjust its duty cycle from the relatively large duty cycle of the CCM mode to the relatively small duty cycle of the DCM mode, the output voltage DCDC_OUT can become undesirably high, which can potentially damage the downstream circuitry (not shown) powered by the output voltage DCDC_OUT.

In addition, when the DC-DC converter 100 is operated in the DCM mode, if the output current loading decreases suddenly and significantly, the output voltage DCDC_OUT can also become undesirably high, because, here, too, the main control loop 110 cannot adjust its duty cycle quickly enough from the relatively large duty cycle of the DCM mode with relatively high output current loading to the relatively small duty cycle of the DCM mode with relatively low output current loading.

BRIEF DESCRIPTION OF THE DRAWINGS

Embodiments of the invention will become more fully apparent from the following detailed description, the appended claims, and the accompanying drawings in which like reference numerals identify similar or identical elements.

FIG. 4 is a signal diagram illustrating the output voltage DCDC_OUT and the inductor current of the prior-art DC-DC converter 100 of FIG. 1 during a scenario that includes a transition from the CCM mode to the DCM mode;

FIG. 5 is a signal diagram illustrating the output voltage DCDC_OUT and the inductor current of the inventive DC-DC converter 300 of FIG. 3 during the same scenario as in FIG. 4;

DETAILED DESCRIPTION

Detailed illustrative embodiments of the invention are disclosed herein. However, specific structural and functional details disclosed herein are merely representative for purposes of describing example embodiments of the invention. The invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3:
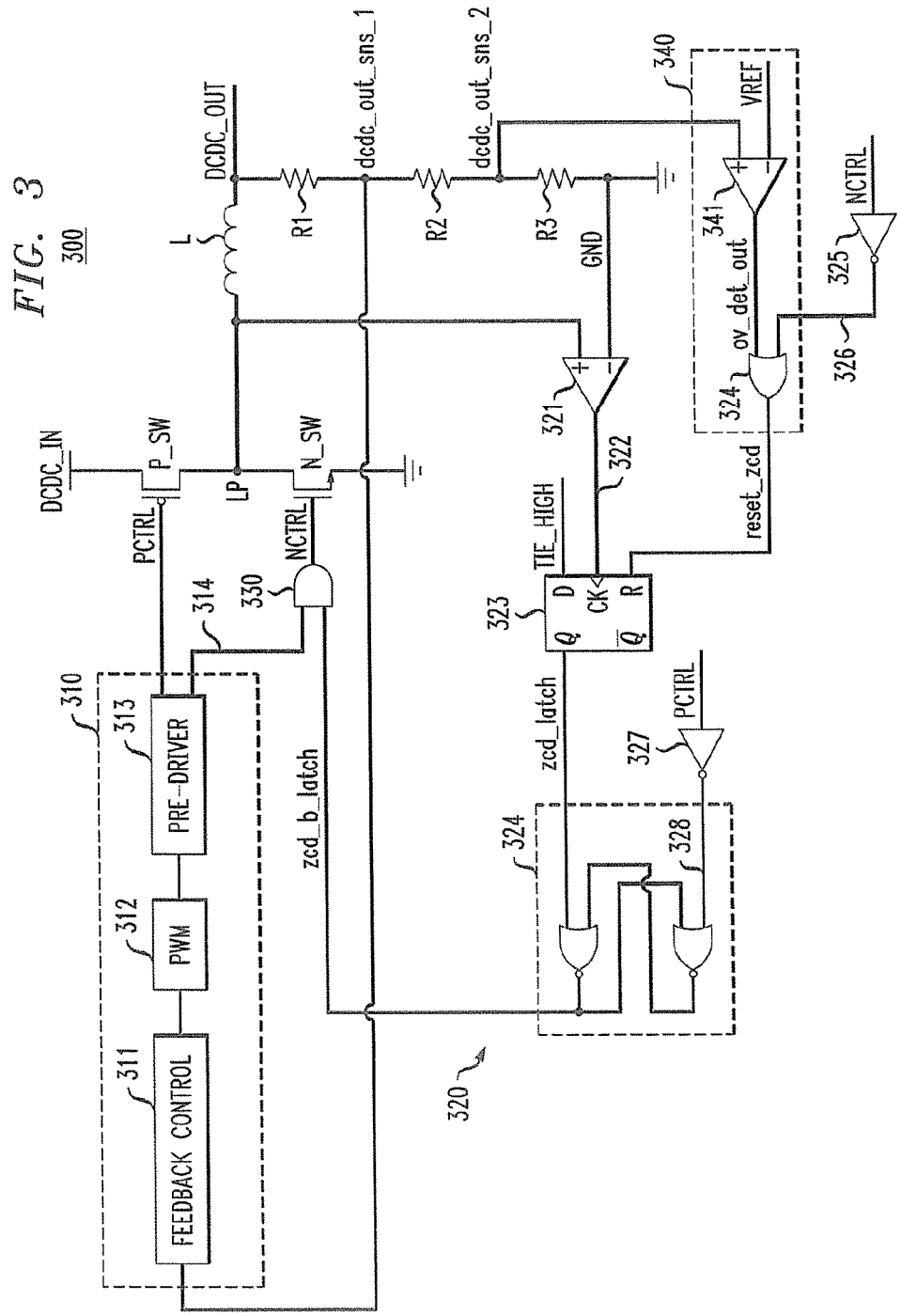
FIG. 3 is a schematic block diagram of a DC-DC buck power converter that converts a DC input voltage into a lower DC output voltage, according to one embodiment of the invention.

FIG. 3 is a schematic block diagram of a DC-DC buck power converter 300 that converts an input DC voltage DCDC_IN into a lower output DC voltage DCDC_OUT, according to one embodiment of the invention. The DC-DC converter 300 is analogous to the DC-DC converter 100 of FIG. 1, with analogous elements having analogous labels performing analogous functions, with the primary exception of the addition of overshoot protection (OP) circuitry 340 including the overshoot-detection (OD) comparator 341 and the OR gate 342. The purpose of the OP circuitry 340 is to prevent or at least inhibit damaging overshoot conditions by (i) detecting when the output voltage DCDC_OUT gets too high and (ii) controlling the switch N_SW to stay on in order to reduce the output voltage DCDC_OUT.

In particular, the OD comparator 341 compares a reference voltage VREF to a feedback signal dcdc_out_sns_2, which is a scaled version of the output voltage DCDC_OUT generated by the feedback resistor divider formed by the resistors R1-R3, where VREF is selected to be a similarly scaled version of a specified threshold output voltage that is a specified amount greater than the desired level for the output voltage DCDC_OUT. For example, in one possible implementation, the desired level for the output voltage DCDC_OUT is 1.15V, the threshold output voltage is 1.2V, and dcdc_out_sns_2 is ½ of the output voltage DCDC_OUT. In that case, VREF will be ½ of the threshold output voltage or 0.6V.

The OD comparator 341 detects when the feedback signal dcdc_out_sns_2 exceeds the reference voltage VREF indicating that the voltage at the output node DCDC_OUT has exceeded the specified threshold output voltage. In that case, the OD comparator 341 drives the OD output signal ov_det_out high. The OR gate 342 receives both the OD output signal ov_det_out and the output 326 from NCTRL inverter 325 and generates the flip-flop reset signal reset_zcd accordingly.

Figure 1:
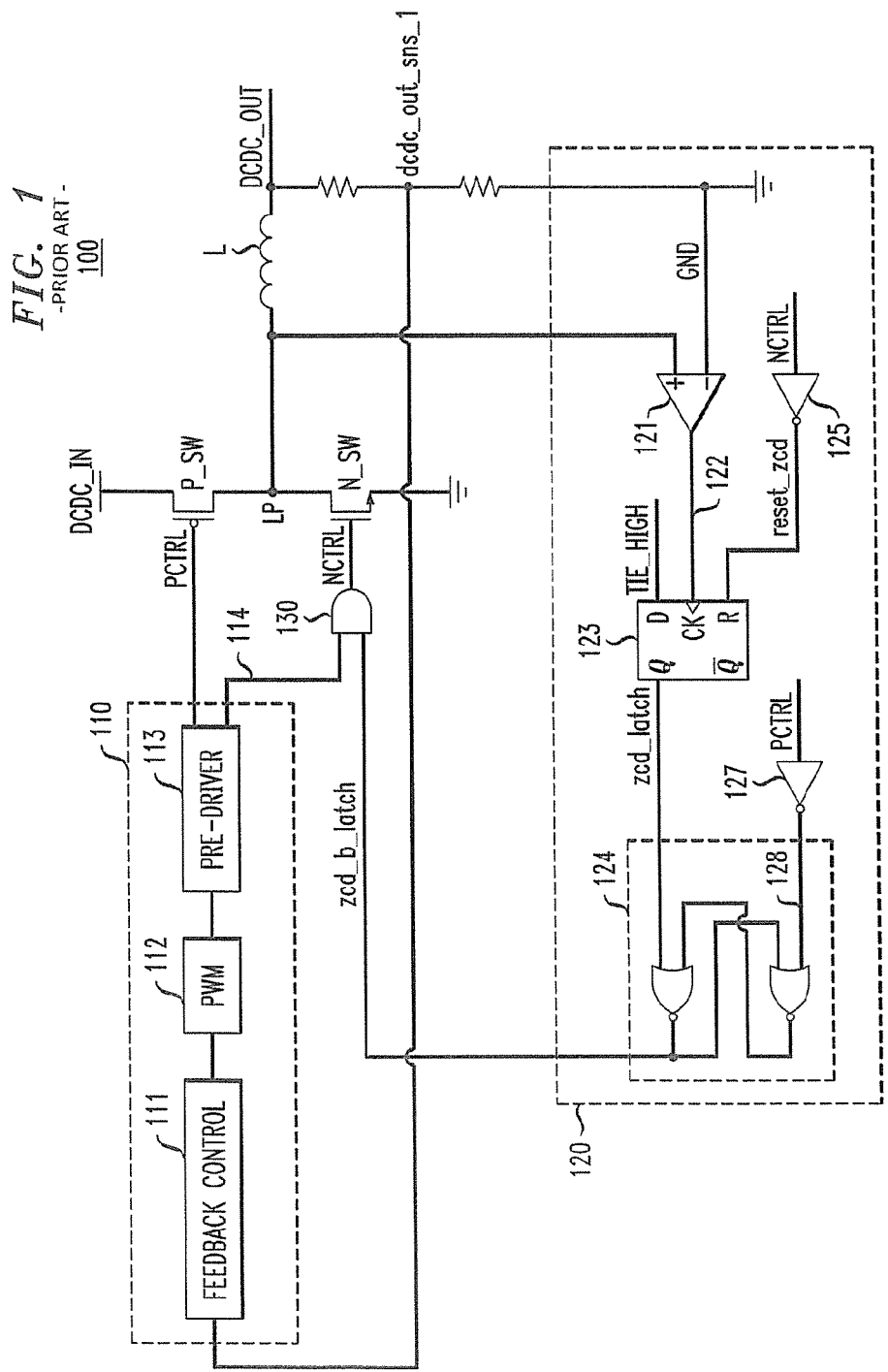
FIG. 1 is a schematic block diagram of a conventional DC-DC buck power converter that converts a DC input voltage into a lower DC output voltage.
Figure 2:
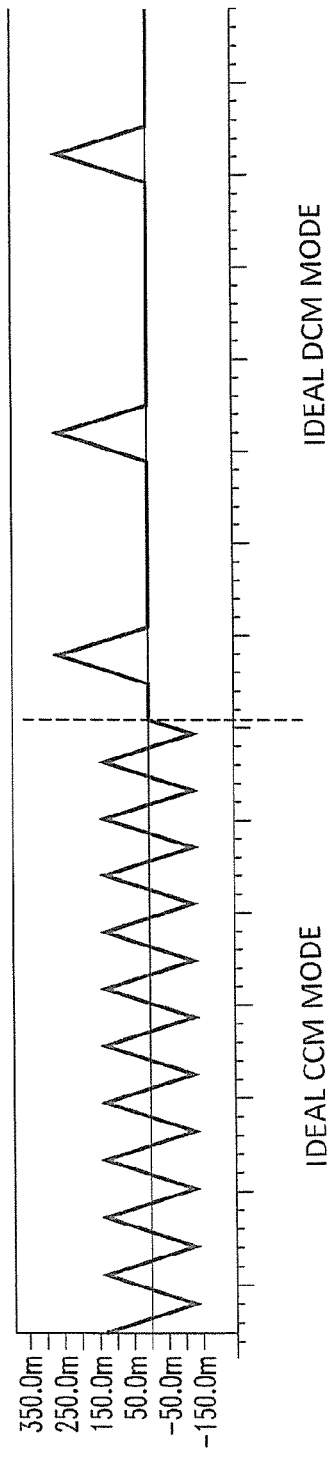
FIG. 2 is a signal diagram illustrating the current flowing through the inductor L during an ideal CCM mode and an ideal DCM mode for the DC-DC converter of FIG. 1.

As long as the feedback signal dcdc_out_sns_2 is less than the reference voltage VREF, the OD output signal ov_det_out will be low, the flip-flop reset signal reset_zcd will be determined by the control signal NCTRL, and the DC-DC converter 300 will operate substantially identical to the DC-DC converter 100 of FIG. 1 in generating the output voltage DCDC_OUT, whether the DC-DC converter 100 is operating in the CCM mode or in the DCM mode.

However, whenever the OD comparator 341 determines that the output voltage DCDC_OUT is too high, the OD output signal ov_det_out will cause the flip-flop reset signal reset_zcd to be high. This, in turn, will cause (i) the latch input signal zcd_latch to be low and (ii) the latch output signal zcd_b_latch to be high. If the main-loop control signal 314 from the pre-driver 314 is high, then the switch control signal NCTRL will also be high, and the switch N_SW will be on. With the switch N_SW on, the inductor current will be decreased and might go to negative, thereby (i) inhibiting the voltage level at the output node DCDC_OUT from continuing to rise fast with the decreasing and positive inductor current and (ii) driving the voltage level at the output node DCDC_OUT to be lower with negative current.

During an overshoot condition (i.e., when dcdc_out_sns2 is greater than VREF), if the switch P_SW is on (i.e., because the switch control signal PCTRL is low) and the switch N_SW is off (i.e., because the main-loop control signal 314 and the switch control signal NCTRL are both low), then the detection of the overshoot condition by the OD comparator 341 will not cause the switch N_SW to turn on even though the latch output signal $zcd\_b_{13}$ latch will be high, because the main-loop control signal 314 will still be low, and both signals have to be high in order to drive the output (NCTRL) of the AND gate 330 high. This prevents both switches P_SW and N_SW from being turned on concurrently when an overshoot condition is detected.

Similarly, during an overshoot condition, if the switch P_SW is off (i.e., because the switch control signal PCTRL is high) and the switch N_SW is off (i.e., because the main-loop control signal 314 or the switch control signal NCTRL is low), then the detection of the overshoot condition by the OD comparator 341 will not cause the switch N_SW to turn on even though the latch output signal zcd_b_latch will be high, because the main-loop control signal 314 will still be low, and both signals have to be high in order to drive the output (NCTRL) of the AND gate 330 high.

However, during an overshoot condition, if the switch P_SW is off (i.e., because the switch control signal PCTRL is high) and the switch N_SW is on (i.e., because the main-loop control signal 314 and the switch control signal NCTRL are both high), then the detection of the overshoot condition by the OD comparator 341 will cause the switch N_SW to stay on as long as the main-loop control signal 314 remains high.

Note that the OD comparator 341 is preferably a hysteresis comparator whose output ov_det_out switches from 0 to 1 when the feedback signal dcdc_out_sns_2 becomes greater than the reference voltage VREF, but whose output ov_det_out switches from 1 to 0 when the feedback signal dcdc_out_sns_2 falls below the reference voltage VREF by a specified hysteresis margin. In this way, the switch N_SW will be ensured to stay on long enough to bring the output voltage DCDC_OUT safely below the threshold output voltage level represented by VREF without toggling or chatter.

As described previously with regard to the DC-DC converter 100 of FIG. 1, the ZCD comparator 321 is enabled to re-configure the DC-DC converter 300 from the CCM mode to the DCM mode. As described previously, if the duty cycle at the beginning of operations in the DCM mode is too large, then the voltage level of the output voltage DCDC_OUT can exceed the desired output voltage level. If the output voltage DCDC_OUT gets too high, then the OP circuitry 340 will detect that condition and essentially override the ZCD circuitry 320 to allow the DC-DC converter 300 to operate in the CCM mode until the output voltage DCDC_OUT is brought sufficiently low again so that the DC-DC converter 300 can return to the DCM mode. This situation is illustrated in FIGS. 4 and 5.

FIG. 4 is a signal diagram illustrating the output voltage DCDC_OUT and the inductor current of the prior-art DC-DC converter 100 of FIG. 1 during a scenario that includes a transition from the CCM mode to the DCM mode at time t=0.1 msec. As shown in FIG. 4, prior to t=0.1 msec, the output voltage DCDC_OUT is at the desired 1.15-volt level. After the CCM-to-DCM transition occurs at t=0.1 msec, DCDC_OUT rises to about 1.29 volts before the control circuitry is able to bring DCDC_OUT back to the desired 1.15-volt level. Note that, after t=0.1 msec, the inductor current never goes negative, because the DC-DC converter 100 stays in the DCM mode.

FIG. 5 is a signal diagram illustrating the output voltage DCDC_OUT and the inductor current of the inventive DC-DC converter 300 of FIG. 3 during the same scenario as in FIG. 4. As shown in FIG. 5 and similar to the scenario in FIG. 4, prior to t=0.1 msec, the output voltage DCDC_OUT is at the desired 1.15-volt level. After the CCM-to-DCM transition occurs at t=0.1 msec, DCDC_OUT rises to only about 1.16 volts before the control circuitry is able to bring DCDC_OUT back to the desired 1.15-volt level.

Note that, immediately after t=0.1 msec, there is a brief time period during which the inductor current never goes negative while the DC-DC converter 300 is in the DCM mode. Following that brief time period, the inductor current does go negative again after the DC-DC converter 300 switches back to the CCM mode. As shown in FIG. 5 after t=0.22 msec, whenever the DC-DC converter 300 determines that the output voltage level is sufficiently low, the DC-DC converter 300 switches back to the DCM mode only to switch back to the CCM mode as soon as the output voltage is again too high, until the DC-DC converter 300 can safely remain in the DCM mode following t=0.29 msec.

Thus, in the scenarios of FIGS. 4 and 5, the prior-art DC-DC converter 100 allows the overshoot condition to reach about 140 mvolts, while the inventive DC-DC converter 300 limits the overshoot condition to only about 10 mvolts.

In addition, as described previously, if the duty cycle during operations in the DCM mode is too large (e.g., immediately after a sudden decrease in the output current loading), then the voltage level of the output voltage DCDC_OUT can also exceed the desired output voltage level. Here, too, if the output voltage DCDC_OUT gets too high, then the OP circuitry 340 will detect that condition and essentially override the ZCD circuitry 320 to allow the DC-DC converter 300 to operate in the CCM mode until the output voltage DCDC_OUT is brought sufficiently low again so that the DC-DC converter 300 can return to the DCM mode. This situation is illustrated in FIGS. 6 and 7.

Figure 6:
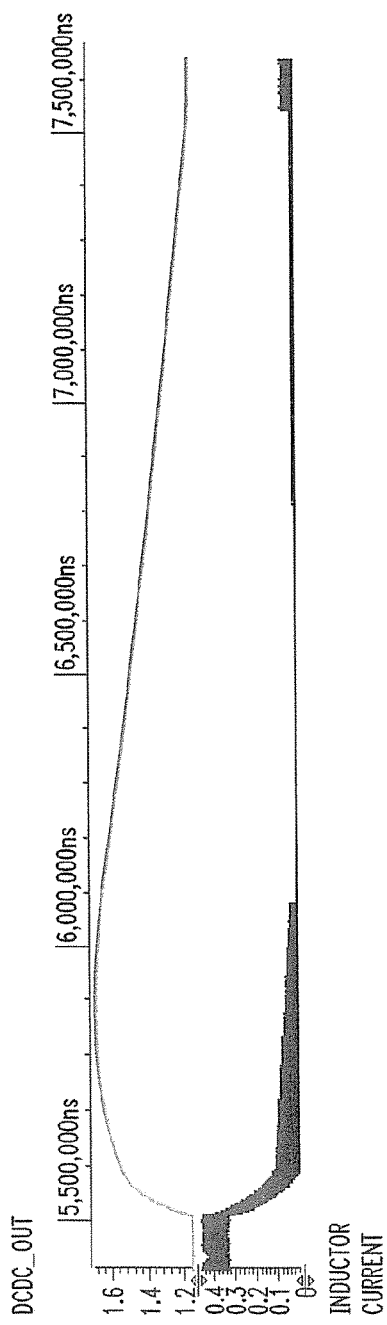
FIG. 6 is a signal diagram illustrating the output voltage DCDC_OUT and the inductor current of the prior-art DC-DC converter 100 of FIG. 1 during a scenario that includes a sudden decrease in output current loading while the DC-DC converter 100 is operating in the DCM mode.

FIG. 6 is a signal diagram illustrating the output voltage DCDC_OUT and the inductor current of the prior-art DC-DC converter 100 of FIG. 1 during a scenario that includes a transition in output current loading from 400 mA to 10 mA at time t=0.55 msec while the DC-DC converter 100 is operating in the DCM mode. As shown in FIG. 6, prior to t=0.55 msec, the output voltage DCDC_OUT is at the desired 1.15-volt level. After the current-load transition occurs at t=0.55 msec, DCDC_OUT rises to about 1.7 volts before the control circuitry is able to bring DCDC_OUT back to the desired 1.15-volt level. Note that, after t=0.55 msec, the inductor current never goes negative, because the DC-DC converter 100 stays in the DCM mode.

Figure 7:
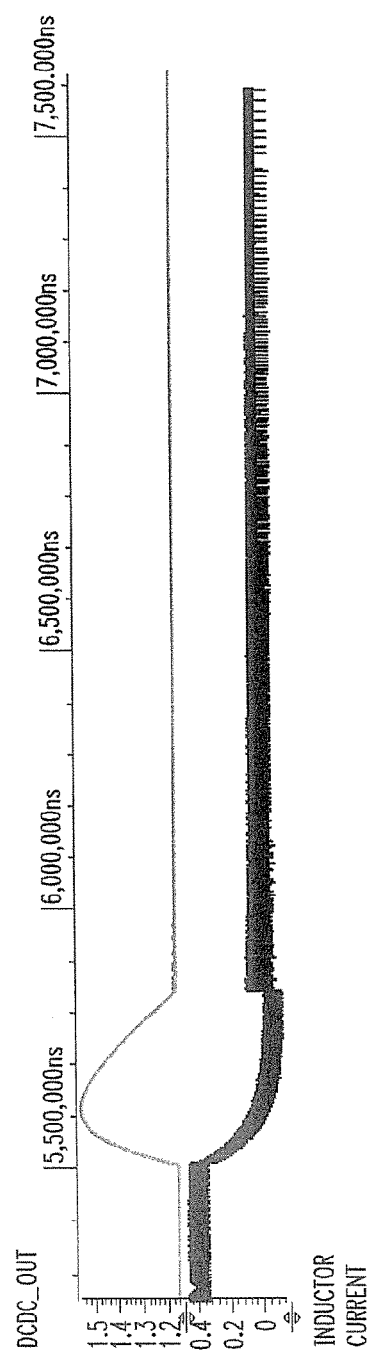
FIG. 7 is a signal diagram illustrating the output voltage DCDC_OUT and the inductor current of the inventive DC-DC converter 300 of FIG. 3 during the same scenario as in FIG. 6.

FIG. 7 is a signal diagram illustrating the output voltage DCDC_OUT and the inductor current of the inventive DC-DC converter 300 of FIG. 3 during the same scenario as in FIG. 6. As shown in FIG. 7 and similar to the scenario in FIG. 6, prior to t=0.55 msec, the output voltage DCDC_OUT is at the desired 1.15-volt level. After the current-load transition occurs at t=0.55 msec, DCDC_OUT rises to only about 1.56 volts before the control circuitry is able to bring DCDC_OUT back to the desired 1.15-volt level.

Note that, from t=0.55 msec to t=0.56 msec, the behavior of the DC-DC converter 300 is the same as the behavior of the DC-DC converter 100 shown in FIG. 6, because the inductor current remains positive even though the DC-DC converter 300 is operating in the CCM mode. From t=0.56 msec to t=0.67 msec, the inductor current goes negative while the DC-DC converter remains in the CCM mode. Following that time period, whenever the DC-DC converter 300 determines that the output voltage level is sufficiently low, the DC-DC converter 300 switches back to the DCM mode only to switch back to the CCM mode as soon as the output voltage is again too high, until the DC-DC converter 300 can safely remain in the DCM mode.

Thus, in the scenarios of FIGS. 6 and 7, the DC-DC converter 300 limits the overshoot condition to only about 410 mvolts, while the prior-art DC-DC converter 100 allows the overshoot condition to reach about 550 mvolts. Furthermore, the inventive DC-DC converter 300 has a much faster settling time than the prior-art DC-DC converter 100 (about 300 microsecond vs. about 2000 microseconds).

Although the invention has been described in the context of a particular set of circuitry designed to (i) detect when the DC output voltage gets too high and then (ii) configure the DC-DC converter to prevent or at least inhibit the DC output voltage from reaching a dangerous overshoot condition, those skilled in the art will understand that there are other suitable sets of circuitry that can be used to achieve those same functions.

Although the DC-DC converter 300 of FIG. 3 has the p-type switch P_SW connected in series with the n-type switch N_SW, in other embodiments of the invention, a DC-DC converter can have two p-type switches connected in series or two n-type switches connected in series.

In certain embodiments, an article of manufacture comprises a DC-DC power converter configured to convert a DC input voltage at an input node into a DC output voltage at an output node. The DC-DC power converter comprises a first switch; a second switch connected to the first switch at an internal node; an inductor connected between the internal node and the output node; a main control loop configured to generate main-loop control signals used to control the first and second switches; and overshoot protection (OP) circuitry configured to generate an OP control signal used to control the second switch to inhibit an overshoot condition at the output node. The first switch is configured to selectively connect the input node to the inductor at the internal node; and the second switch is configured to selectively connect a ground node to the inductor at the internal node.

In some of the above embodiments, the OP circuitry comprises an overshoot-detection (OD) comparator that generates an OD-comparator output signal indicating when the DC output voltage reaches a specified high voltage level, and OP logic circuitry that generates the OP control signal based on the OD-comparator output signal. The OD comparator compares a feedback voltage signal representing the DC output voltage to a reference voltage signal representing a threshold DC output voltage level to generate the OD-comparator output signal. The main control loop generates the main-loop control signals to selectively operate the DC-DC power converter in either of a continuous-conduction mode (CCM) and a discontinuous-conduction mode (DCM).

The OP circuitry is configured to prevent the DC-DC power converter from operating in the DCM mode when the DC output voltage reaches a specified high voltage level.

The DC-DC power converter further comprises zero-crossing detection (ZCD) circuitry that inhibits negative inductor currents during the DCM mode. The OP circuitry overrides the ZCD circuitry when the DC output voltage reaches a specified high voltage level. The ZCD circuitry comprises a ZCD comparator that generates a ZCD-comparator output signal indicating when voltage at the internal node reaches zero, and ZCD logic that generates a ZCD control signal used to control the second switch based on the ZCD-comparator output signal and the OP control signal from the OP circuitry.

The ZCD logic comprises a ZCD flip-flop (FF) that generates a ZCD-FF output signal based on the ZCD-comparator output signal and the OP control signal, and a ZCD latch that generates the ZCD control signal based on the ZCD-FF output signal. The OP circuitry comprises an overshoot-detection (OD) comparator that generates an OD-comparator output signal indicating when the DC output voltage reaches a specified high voltage level, and OP logic circuitry that generates the OP control signal based on the OD-comparator output signal. The OD comparator compares a feedback voltage signal representing the DC output voltage to a reference voltage signal representing a threshold DC output voltage level to generate the OD-comparator output signal.

In some of the above embodiments, the article is the DC-DC power converter, and in some of the above embodiments, the article is a consumer device comprising the DC-DC power converter.

Unless explicitly stated otherwise, each numerical value and range should be interpreted as being approximate as if the word "about" or "approximately" preceded the value or range.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, or paths may be referred to by the same name and are interchangeable for purposes here.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. An article of manufacture comprising a DC-DC power converter configured to convert a DC input voltage at an input node into a DC output voltage at an output node, the DC-DC power converter comprising:
   a first switch;
   a second switch connected to the first switch at an internal node;
   an inductor connected between. the internal node and the output node, wherein:
      the first switch is configured to selectively connect the input node to the inductor at the internal node; and
      the second switch is configured to selectively connect a ground node to the inductor at the internal node;
   a main control loop configured to generate main-loop control signals used to control the first and second switches; and
   overshoot protection (OP) circuitry configured to generate an OP control signal used to control the second switch to inhibit an overshoot condition at the output node, wherein the OP circuitry comprises:
      an overshoot-detection (GD) comparator that generates an OD-comparator output signal indicating when the DC output voltage reaches a specified high voltage level; and
      OP logic circuitry that generates the OP control signal based on the OD-comparator output signal.

2. The article of claim 1, wherein the OD comparator is configured to compare a feedback voltage signal representing the DC output voltage to a reference voltage signal representing a threshold DC output voltage level to generate the OD-comparator output signal.

3. The article of claim 1, wherein the main control loop generates the main-loop control signals to selectively operate the DC-DC power converter in either of a continuous-conduction mode (CCM) and a discontinuous-conduction mode (DCM).

4. The article of claim 3, wherein the OP circuitry is configured to prevent the DC-DC power converter from operating in the DCM mode when the DC output voltage reaches the specified high voltage level.

5. The article of claim 3, wherein the DC-DC power converter further comprises a zero-crossing detection (ZCD) circuit that inhibits negative inductor currents during the DCM mode.

6. The article of claim 5, wherein the OP circuitry overrides the ZCD circuit when the DC output voltage reaches the specified high voltage level.

7. The article of claim 5, wherein the ZCD circuit comprises:
   a ZCD comparator that generates a ZCD-comparator output signal indicating when voltage at the internal node reaches zero; and
   ZCD logic configured to generate a ZCD control signal used to control the second switch based on the ZCD-comparator output signal and the OP control signal from the OP circuitry.

8. The article of claim 7, wherein the ZCD logic comprises:
   a ZCD flip-flop (FF) that generates a ZCD-FF output signal based on the ZCD-comparator output signal and the OP control signal; and a ZCD latch that generates the ZCD control signal based on the ZCD-FF output signal.

9. The article of claim 1, wherein the OD comparator compares a feedback voltage signal representing the DC output voltage to a reference voltage signal representing a threshold DC output voltage level to generate the OD-comparator output signal.

10. The article of claim 1, wherein:
the first switch is a p-type switch; and
the second switch is an n-type switch.

* * * * *